United States Patent
Fujieda et al.

(10) Patent No.: US 7,248,894 B2
(45) Date of Patent: Jul. 24, 2007

(54) DATA TRANSFER SYSTEM

(75) Inventors: Kennosuke Fujieda, Chiba (JP); Osamu Hattori, Chiba (JP); Norihiro Okamoto, Chiba (JP)

(73) Assignee: Seiko Instruments Inc. (JP)

(*) Notice: Subject to any disclaimer, the term of this patent is extended or adjusted under 35 U.S.C. 154(b) by 660 days.

(21) Appl. No.: 10/413,352

(22) Filed: Apr. 14, 2003

(65) Prior Publication Data

US 2003/0236100 A1 Dec. 25, 2003

(30) Foreign Application Priority Data

Apr. 16, 2002 (JP) ............................. 2002-113581

(51) Int. Cl.
*H04B 1/38* (2006.01)
*H04M 1/00* (2006.01)

(52) U.S. Cl. ................... 455/557; 455/575.6; 455/41.2; 455/67.14; 455/412.2; 455/563; 455/466; 455/435.1; 340/506; 340/539; 340/539.28

(58) Field of Classification Search ............ 455/412.2, 455/557, 67.14, 563, 466, 414.3, 423, 432.1, 455/433, 435.1, 575.6, 41.2; 340/506, 539, 340/539.28

See application file for complete search history.

(56) References Cited

U.S. PATENT DOCUMENTS 5,534,851 A * 7/1996 Russek ............... 340/573.4
6,104,913 A * 8/2000 McAllister ............ 455/41.1
6,163,546 A * 12/2000 Sipila ...................... 370/466
6,804,526 B1 * 10/2004 Yarkosky ................ 455/466
6,823,182 B1 * 11/2004 Higuchi et al. .......... 455/412.1
6,847,892 B2 * 1/2005 Zhou et al. ............... 701/213
6,853,851 B1 * 2/2005 Rautiola et al. ......... 455/553.1

FOREIGN PATENT DOCUMENTS

| JP | 61283979 | 12/1986 |
| JP | 05347573 | 12/1993 |
| JP | 9138275 | 5/1997 |
| JP | 11164030 | 6/1999 |
| JP | 11206721 | 8/1999 |
| JP | 01094486 | 4/2001 |
| JP | 01258858 | 9/2001 |
| JP | 02042082 | 2/2002 |
| JP | 02113581 | 4/2006 |

* cited by examiner

*Primary Examiner*—Marceau Milord
(74) *Attorney, Agent, or Firm*—Adams & Wilks

(57) ABSTRACT

A data transfer system has one or more mobile stations each wearable by a living being for transmitting signals containing physiological information of the living being in response to a start command, and a base station for transmitting the start command to instruct the mobile stations to transmit the signals and thereafter receiving the signals containing the physiological information from the mobile stations. Thus, the mobile stations consume a small amount of power because they only transmit information when requested to do so. A remote computer is connected to the base station for determining a status of the living beings by receiving the physiological information from the base station and analyzing the physiological information.

29 Claims, 11 Drawing Sheets

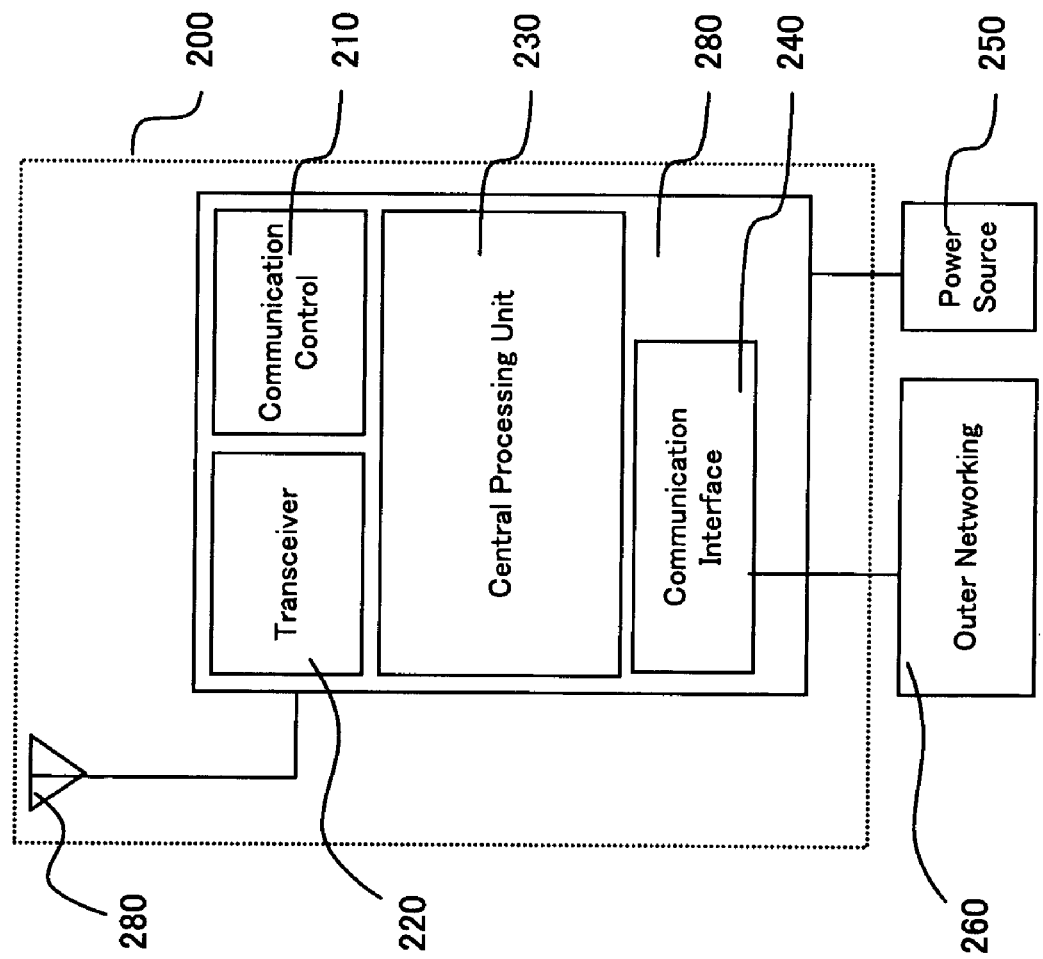

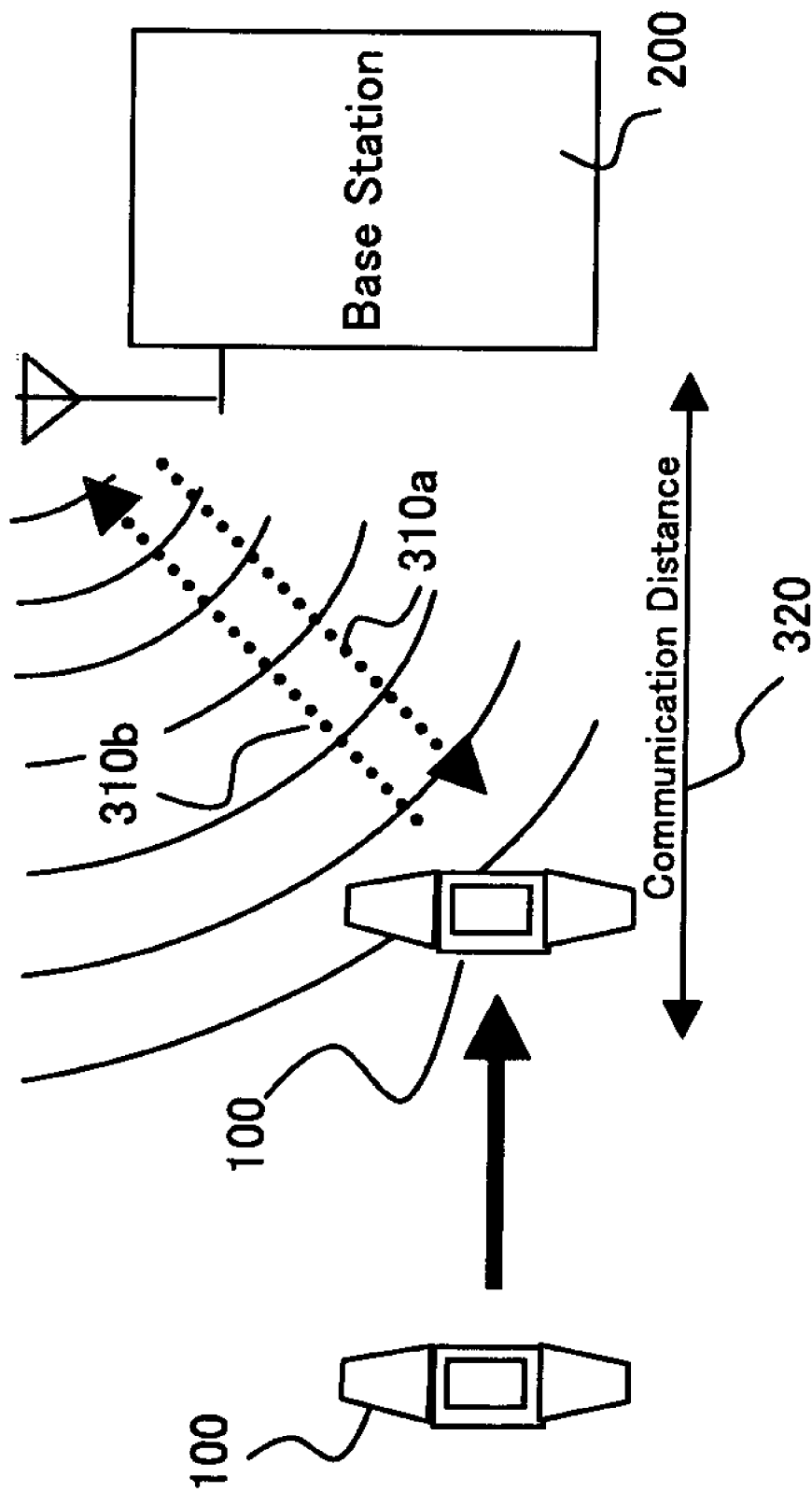

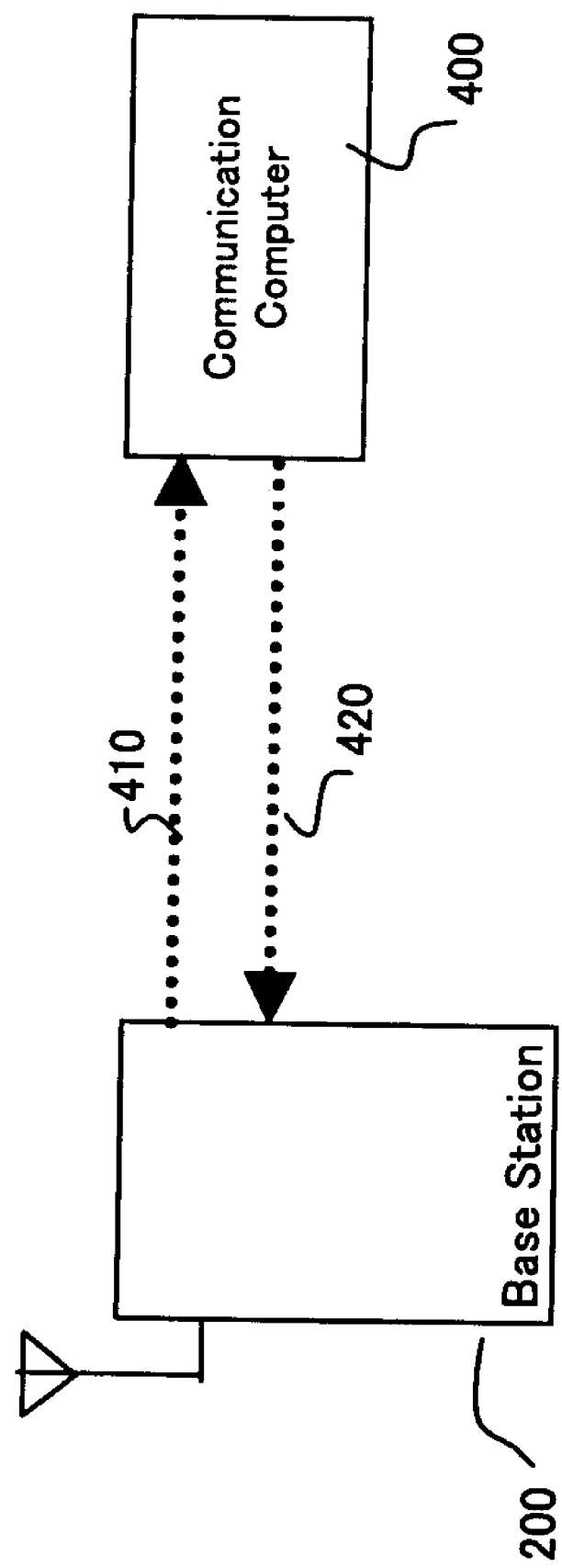

DATA TRANSFER SYSTEM

BACKGROUND OF THE INVENTION

1. Field of the Invention

This invention belongs the field of the data transfer system that deals with the information of living organisms such as a human, a horse, a cow a, a dog, etc.

2. Description of the Prior Art

There exist a variety of communication methods that transfer the data of living organism through a mobile radio link. The most are the method that a mobile station actively emits the data and the immobile station receives the data transmitted by the mobile station. In other words the data emission is with very high power and reception of data is forced by high power emission, or existence of radio echo repeater between the emitter and the receptor helps the reception by means of data communication by passing the radio echo repeater, or existence of multiple receptors increases a chance of data reception. Frequently a mobile radio station is operated by a battery so that frequent change or recharging of the battery is forcefully required if the high power data emission is performed.

In order for a human to carry radio equipment, the weight and the size of the radio equipment must be limited. A radio transceiver usually needs to be integrated in an item such that the person who carries the radio equipment does not feel uncomfortable. For example, in the case of radio equipment integrated in a wrist watch, the person may always carry the wrist watch because most wrist watches are waterproof and there is no need to remove the wrist watch while bathing or work related to water. However, for carrying the wrist watch on a user's hand, the battery has to be small and frequent change or recharging of battery is necessary if frequent radio communication is performed. The battery life of the radio equipment integrated in a wrist watch is determined by the transmission power, the frequency of the communication and transmission duration. For the application field of status monitoring, such as monitoring the status of elderly people, it is a complicated task for an elderly person to change or recharge the battery frequently. On the other hand, decreasing transmission power in order to minimize power consumption makes it difficult for the receptor to receive the data.

Moreover, in the case that the radio equipment is attached to the wrist, the polarization of radio wave waves emitted from the radio equipment on the wrist changes time to time when the user's hands are moved during the transmission and reception because movement of the human hand is complicated. For the reception of a direct wave, a change in polarization plane results in a change in induced current on an antenna. In other words, readability varies as a function of time. For this reason, the radio wave emitted from the mobile station may not always reach the immobile station with effective strength. This phenomenon causes a problem in that the radio equipment of the immobile or base station may not receive a signal even if a health status change occurred in the person who carries the mobile station.

SUMMARY OF THE INVENTION

A data transfer system of this invention comprises a mobile station which is wearable by a living organism for transmitting signals containing information related to living activity of the living organism and an immobile or base station for receiving the signals from the mobile station, wherein the immobile station transmits a start signal to the mobile station in order to request the mobile station to start the data transfer, and the mobile station transmits the signals containing the information after receiving the start signal.

For the application of nursing care of elderly persons, one month of battery life is adequate. The description of this application includes the management of following two types of situations. The first one is creation of monitoring system of everyday activity of an elderly person living alone who has an underlying disease or who is sick but has a healthy outlook, and the second is individual health management of a pool of elderly persons described of the type described in the first case. A computer integrated wrist watch coupled with low power radio of transmitting means is used as a status monitor, and the battery life can be extended by employment of devised transmission method. Systematizing the communication means facilitates the creation of a multi-purpose monitoring system with a simple structure and low cost.

The data transfer system of this invention is characterized in that while the mobile station receives an information signal and then the signal is no longer received by the mobile station, the immobile station transmits the command for the mobile station to send the information signals, and the mobile station receives the command and transmits the information related to the living organism based on the command.

The data transfer system of this invention deals with one of the information related with a living organism such as blood pulse, blood pressure, activity, body position and body temperature.

The data transfer system of this invention equips a radio system communicates with circular polarized radio wave.

The data transfer system of this invention equips the apparatus that is connected with the immobile station by means of either wired or wireless and receives the information from the immobile station and diagnoses the movement of the living organism.

The data transfer system of this invention equips the apparatus described above that transfers the commands to be ordered through the immobile station.

Simplifying the monitor system itself is a factor to reduce the cost. Recently, evolution of communication system lets a personal computer equips a modem for phone line in majority and the communication to outside becomes programmable.

In case that necessary communication could not establish because of uncertainty of radio communication the immobile station will inform the status to the predefined destination.

The data transfer system of this invention is, when the information about the living organism exceeds the boundary values that received from the immobile station, the mobile station informs the condition out of boundary values to the living organism. As uncertainty of radio communication and taking a consideration of the case where the content of emergency communication does not always get to the destination, the sudden change of and danger in human health condition detected from the sampled human body index will be informed to the person who wear the mobile station.

BRIEF DESCRIPTION OF THE SEVERAL VIEWS OF THE DRAWINGS

A preferred form of the present invention is illustrated in the accompanying drawings in which:

FIG. 2 is a basic configuration of the radio equipment of the immobile station;

FIG. 3 shows the inter-communication between the radio equipment of the mobile station and the radio equipment of the immobile station;

FIG. 4 shows the inter-reaction between the radio equipment of the immobile station and the communication computer;

DETAILED DESCRIPTION OF THE PREFERRED EMBODIMENTS

Embodiment 1

Figure 1:
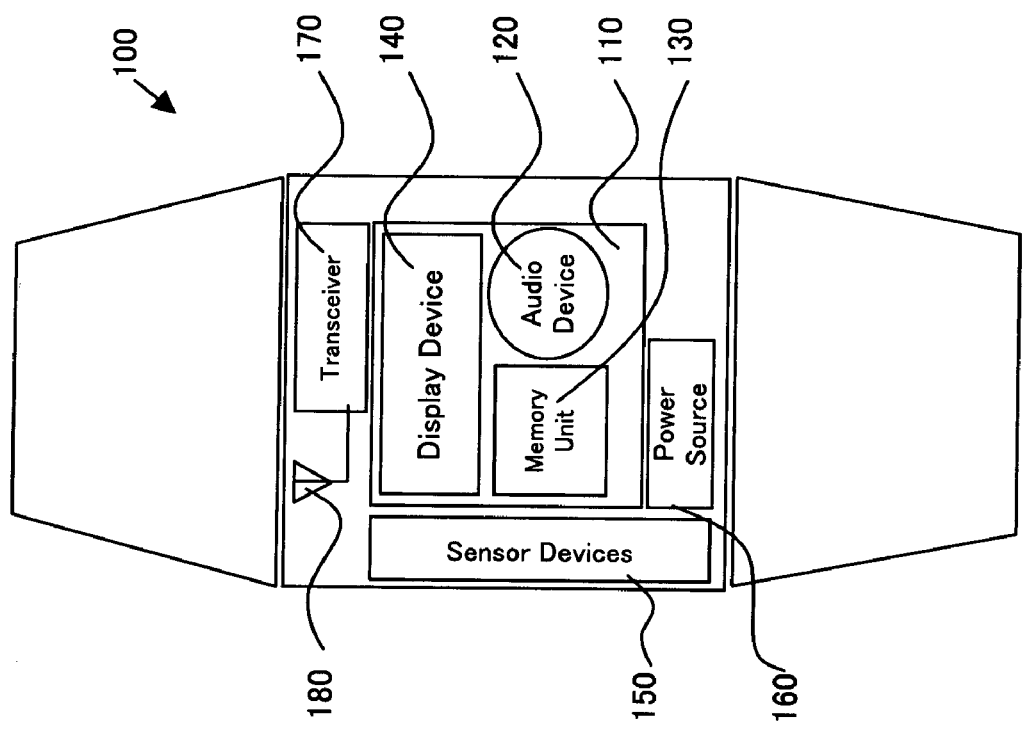
FIG. 1 is a basic configuration of the radio equipment of the mobile station.

A description will now be made of an embodiment of the data transfer system of this invention with reference to the attached figures. FIG. 1 shows the basic block diagram of mobile radio equipment serving as a mobile station. Mobile radio equipment 100 is attached a part of a living organs. For example, an arm for a human being and legs or neck for a cow are appropriate places of attachment. In this embodiment, the explanation is based on when a human being wears the mobile station on his arm.

The basic structure of the mobile radio equipment 100 is comprised of the wristwatch type computer 110, sensor units to measure the information of the human body or the environment in which the human being wearing the device is located, a power unit 160, a transceiver unit 170 to make communications with the immobile or base station, and an antenna 180 for transmission and reception.

The wristwatch type computer 110 is comprised of, among other things, a sound unit 120, data memory unit 130, and a display unit 140. The sound unit 120 may ask the person (carrier) who is wearing the mobile radio equipment 100 a question such as how he or she currently feels. Moreover, the sound unit 120 may additionally or alternately emit a non-speech sound such as an alarm. The data memory unit 130 stores the health management software that is programmed along with the carrier's health condition. Moreover, the data memory unit 130 stores the information of the carrier and the sampled values measured by the sensor units 150. The display unit 140 displays the content of a question to ask the carrier or a command to indicate to the carrier. It is possible to provide the display unit 140 and the sound unit 120 to function together to provide for the vidual display and the sound or to combine these two functions.

The sensor units 150 have a function of sensing physiological information of a living organism. The information of the living organism that is been sensed is sent to the wristwatch type computer 110. The power unit 160 supplies electrical power to the computer integrated in the wristwatch 110, sensor units 150 and the transceiver unit 170. The transceiver unit communicates with the base station indicated in FIG. 2, and transmits the information of the carrier saved in the data memory unit 130 and receives the information to be transferred to the user. The antenna 180, coupled with the transceiver unit 170, propagates a radio wave into the atmosphere.

The sensor units 150 in the wristwatch-type computer 110 combined into the mobile radio equipment 100 read the information of the carrier or the environment that the carrier is located in under a given condition. The information read out is sent to the wristwatch type computer 110. The information that has been sent is stored in the data memory unit 130 in the wristwatch type computer 110 with time information. The wristwatch type computer 110, using the preinstalled health management software, when most recent information is out of the boundaries defined in the health management software, the wristwatch type computer 100 will inform, using the display function and announcing function by voice and sounds, the out of boundary status to the carrier or user who wears the mobile radio equipment 100. In the same manner, the transceiver 170 receives a report sent toward the mobile radio equipment 100.

FIG. 2 shows the basic block diagram of the immobile base station radio equipment. The radio equipment 200 of the immobile station is comprised of the immobile station circuit 280 and the antenna 270. The radio equipment 200 of the immobile stations is connected to an outdoor communication network, for sending the data with a defined protocol from the communication interface 240 over either wired or wireless means, connected to the communication computer. Then, the radio equipment 200 of the immobile station exchanges many types of data with the communication computer. The radio equipment 200 of the immobile station is powered by the power supply unit 250. The immobile station circuit may have a high capacity rechargeable battery.

The immobile station circuit 280 is comprised of a communication interface 240 to connect with the outdoor communication network 260, the central processing unit 230 to perform calculations, the communication control circuit 210 to control communication traffic, the transceiver 220 to communicate with the radio equipment of the mobile station, and the antenna 290.

The communication interface 240 is an interface based either on LAN (Local Area Network) specification or on the popular protocol for a modem. The central processing unit 230 controls over the exchange of marks through the communication interface 240 or manages the exchange of data between the radio equipment of the mobile station. The transceiver 220 establishes bi-directional communication with the radio equipment of the mobile station. The antenna 270, connecting with the transceiver 220, propagates radio wave to the atmosphere.

FIG. 3 indicates the exchange of marks between the radio equipment 100 of the mobile station and the radio equipment 200 of the of the base station.

The radio equipment 200 of the base station is located at a place near the carrier that is selected based on where the carrier of the radio equipment 100 of the mobile station goes by frequently.

The radio equipment 200 of the immobile station transmits, continuously at a defined interval, the transmission command 310a toward the radio equipment 100 of the mobile station. The radio equipment 200 of the immobile station keeps watching to determine whether the radio equipment 100 of the mobile station is within the communication range 320 or not. If the radio equipment 100 of the mobile station is not within the communication range 320 with the radio equipment 200 of the immobile station, the radio equipment 100 of the mobile station remains in a sleep mode or simply the current time is displayed on the display unit 140. If the radio equipment 100, on the other hand, is within communication range 320 with the radio equipment 200 of the immobile station, the radio equipment 100 of the mobile station sends the reply signal 310b to the radio equipment 200 of the immobile station when the radio equipment 100 of the mobile station received the transmission command 310a from the radio equipment 200 of the immobile station. The reply signal 310b contains the different data of the carrier stored in the data memory unit 130 such as the information of the living organism or the environment the living organism is located.

FIG. 4 shows the communication relation between the radio equipment of the immobile station and the communication computer 400. The radio equipment 200 of the immobile station is connected with the communication computer 400 by wired and/or wireless means toward the outdoor communication network. The radio equipment 200 of the immobile station stores the information of the carrier or the environment that the carrier is located. Such information will be sent 410 to the communication computer 400. The radio equipment 200 of the immobile station, including the time and the fact that the communication is established with the communication computer 400, transfer the information received to the communication computer 400. The communication computer 400 analyses the activity and the ecological movement of the carrier based on the data received. While the transfer of data, the destination of transfer and the nature of data to be sent are reregistered and by the defined method the defined information can be transferred through the public communication mean. If the carrier indicates abnormal activities or if his physical condition is distorted, the communication computer 400 may send the data to limit the activity of the carrier and the question related to his health to ask the carrier.

The radio equipment 100 of the mobile station, the radio equipment 200 of the immobile station and the communication computer 400 serves, for example, as a health management system for a patient who has an underlying disease but who can live a normal life, and a system to confirm the safety of an elderly person, especially an elderly person who lives alone. The system described above also serves as a continuous watching system for use in a house where the target person lives such as a hospital or a retirement or nursing home.

FIG. 5 show the radio antennas of the radio equipment of the mobile station and the radio equipment of the immobile station. FIG. 5A shows the radio antenna of the radio equipment of the immobile station. The antenna 510 is located on the top of the radio equipment 200 of the immobile station and has a shape of a cross. The impedance matching method for the radio antenna 510 is gamma-matching method. The antenna is comprised 90 degree crossed 2 metal rods of half lambda of wavelength and is fed through the gamma rod. The phase between 2 feeding points is set at 90 degrees and two feed points are fed in 90 degrees in phase by using a signal delay line.

Figure 5B:
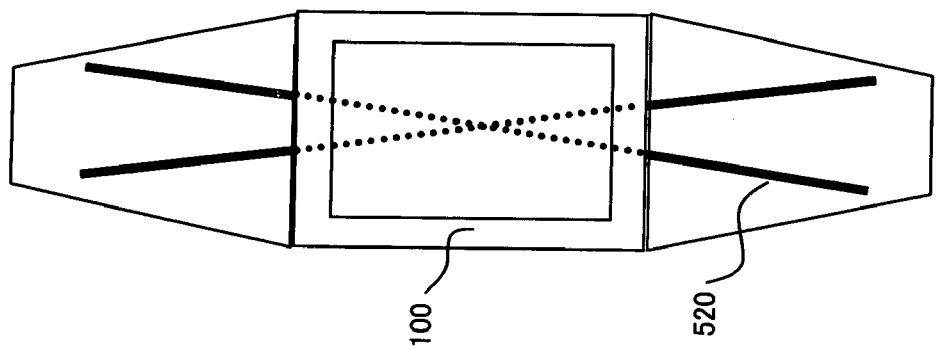
FIG. 5 show the antenna of the radio equipment of the mobile station and the antenna of the radio equipment of the immobile station.

FIG. 5B shows the antenna of the radio equipment of the mobile station. The radio antenna 510 of the radio equipment 100 of the mobile station ideally should be the same as the one for the radio equipment 200 of the immobile station. If the radio equipment 100 of the mobile station has the shape of the wrist watch-shaped radio equipment, the wiring position has to be selected taking a consideration of efficiency of the antenna and the wristwatch shape. For the radio equipment 100 of the mobile station the 4 wires of the antenna 520 stick out from the center is placed along the watch band. The place of antenna should be the point where away for the body of the living organism as much as possible. The body of the living organism acts as the radio frequency ground. For the reason it is very important that the antenna position should be away from the body of the living organism in order to avoid the effect of the ground. The phase difference of two wires of antenna is the angle of two wires from the center to the edge of the band.

Figure 5D:
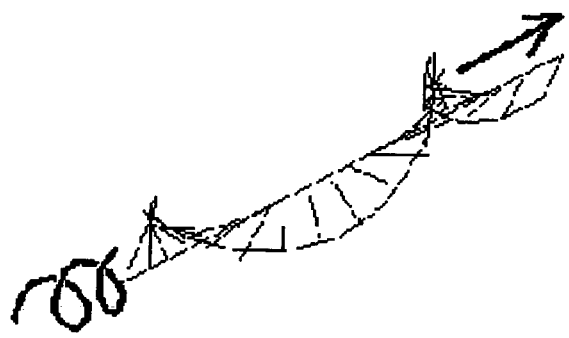
Figure 5A:
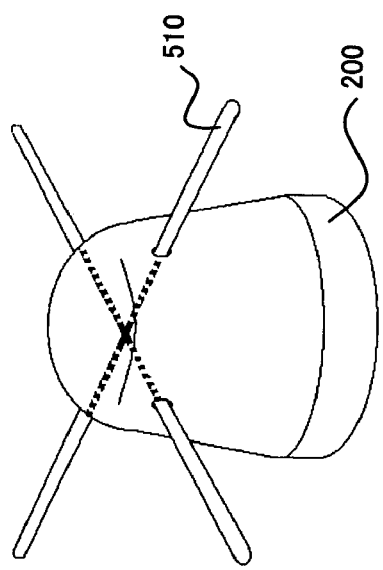
Figure 5C:
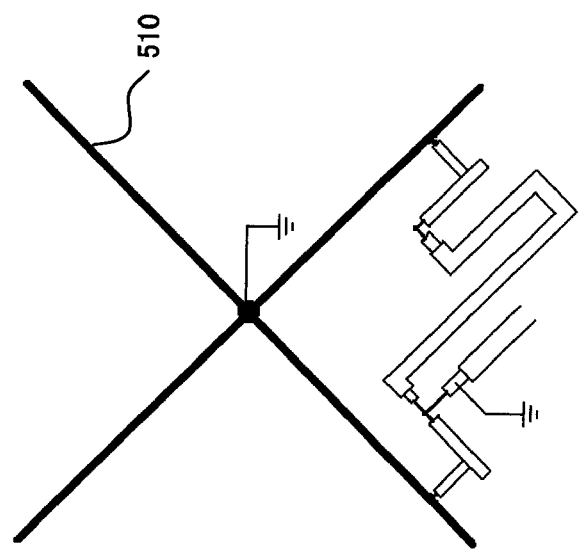

FIG. 5C shows schematic of the antenna of circular polarization. FIG. 5D shows the directivity of circular polarization. Upon a communication the radio equipment 200 of the immobile station is obliged to receive surely the content transmitted from the radio equipment 100 of the mobile station. If the polarization plane is fixed either in vertical or in horizontal, the relative polarization plane between the sender to the receiver the current induced on the antenna 510 of the radio equipment 200 of the immobile station may vary and ill recovered portion of the information may appear because of the phenomenon. For the reason this embodiment indicates, rotating the polarization plane, it makes possible to minimize the reception strength variation. For the case of circular polarization the speed of rotating the polarization plane is directly related to the frequency of the radio wave in use. Therefore, the speed of the rotating polarization plane is much faster than the movement of the human arm. Thus, radio wave of the uniform field strength is emitted even if the arm of the carrier of the radio equipment 100 of the mobile station varies its position.

Figure 6:
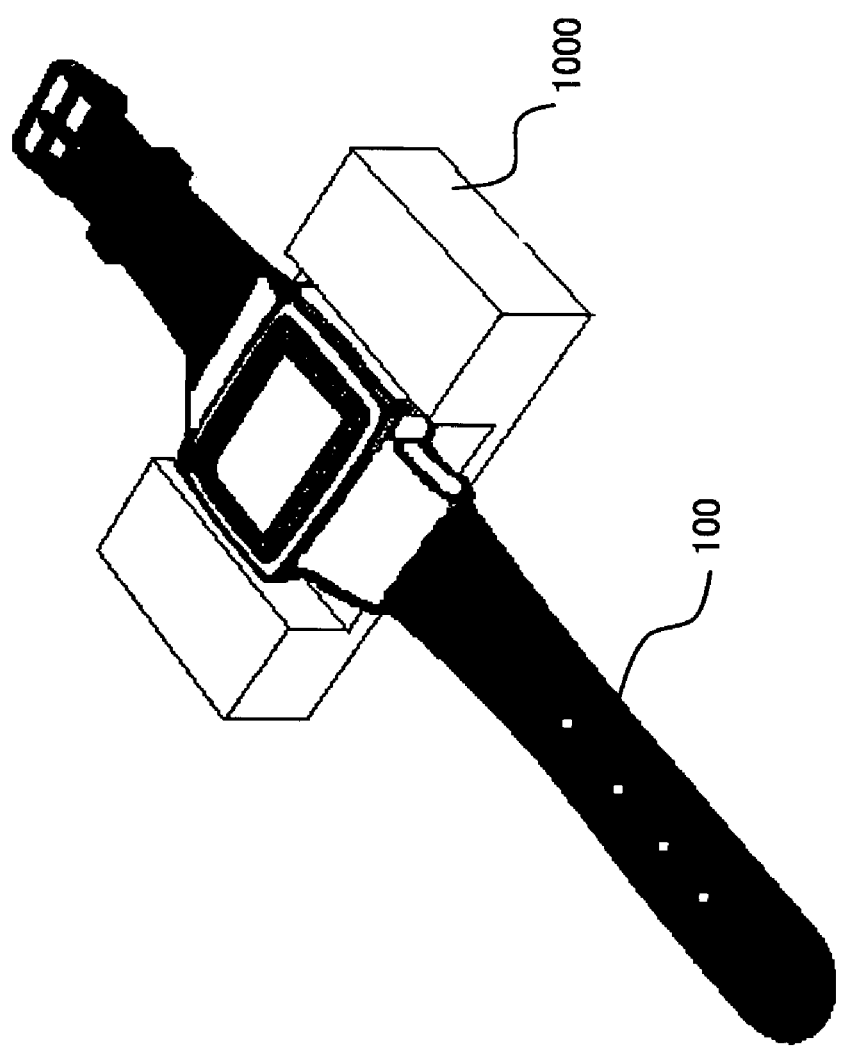
FIG. 6 shows at oblique perspective figure of recharging the radio equipment of the mobile station.

FIG. 6 is a schematic of charging the radio equipment of the mobile station. In order to maintain the function of the radio equipment 100 of the mobile station the inevitable action is the recharging the radio equipment 100 of the mobile station. Against the radio equipment 200 of the immobile station that has the function of the immobile station, the radio equipment 100 of the mobile station acts passive, and responds only when two radio equipments are within communication range, and has the effect to save the power consumption while the transmission. Except while performing the defined action the radio equipment 100 of the mobile station remains asleep so that a battery is sufficient power source to operate it. In this embodiment recharging frequency is resulted once a month at most. The recharging method is simply placing the radio equipment 100 of the mobile station on the battery charger 1000. A home help may recharge easily the radio equipment 100 of the mobile station. The recharging duration is sufficient enough for several hours. For the reason the length of time while a home help gives a care to the carrier of the radio equipment 100 of the mobile station may be enough duration for recharging if the home help take an action of recharging. If recharging action does not takes place and the radio equipment 100 of the mobile station lost the function of transmission, the radio equipment 200 of the immobile station recognizes as the carrier of the radio equipment 100 of the mobile station does not go through the point he usually goes through. Such condition is considered to be an abnormal status so that the communication computer 400 informs the report of the abnormal status to the pre-registered emergency destinations. Then, the persons at the emergency destination or the related persons may find the fact either simply forgets of recharging or that there happened a situation that the carrier was unable to perform recharging action.

Embodiment 2

Figure 7:
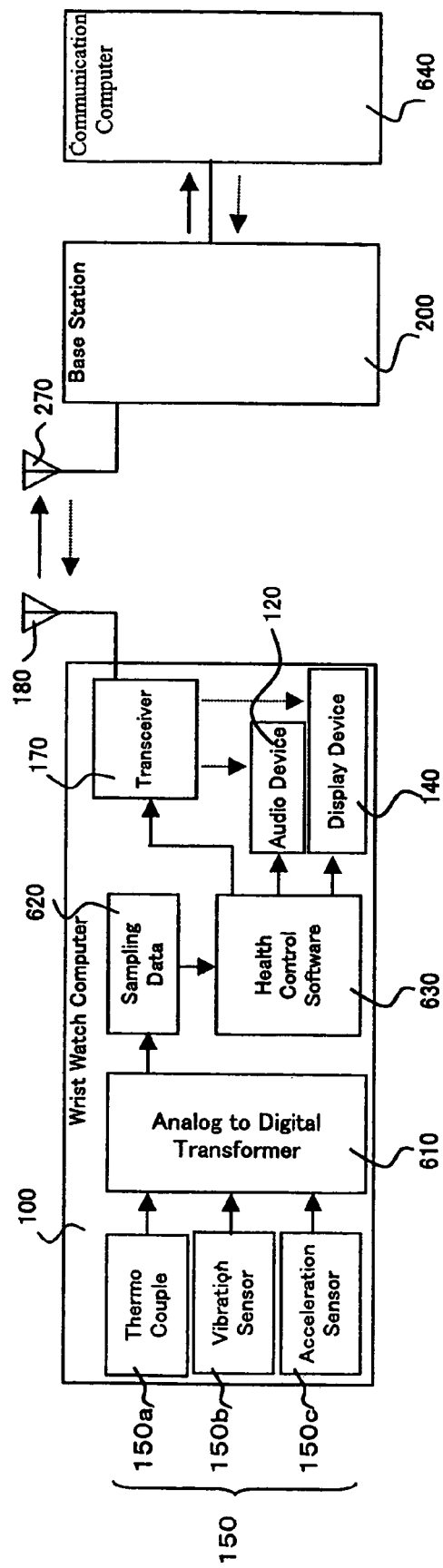
FIG. 7 is an abbreviated figure of the health control system of the carrier of the radio equipment of the mobile station.

FIG. 7 shows a diagram of the health control system for the carrier. This system is comprised the radio equipment 100 of the mobile station wearable by a carrier, the radio equipment 200 of the immobile station that is located at a point where the carrier passes by frequently, and the communication computer 400 that holds the information of the carrier.

The radio equipment 100 of the mobile station uses the wristwatch type computer in order to acquire the index of the human body and that of the status of the environment in which the carrier is located. The sensors integrated therein may be of many different types. In the embodiments described herein, three types of sensors are used as the sensor units 150, including a thermocouple 150a, a vibration detector 150b, and an acceleration sensor 150c. The thermocouple 150a measures the body and ambient temperatures. The vibration detector 150b measures the rate of blood pulse. The acceleration sensor 150c detects the movement activity of the human body. The values coming out of each sensor 150a, 150b and 150c are in the form of analog signals so that the values have to be digitized by using the analog to digital converter 610. The digitized values are sent to the sampling data circuit 620 and are treated as sampled data. The sampling data circuit 620 stores the sampled data.

The watch shape computer 100 reads the values of the sensor 150a, 150b, and 150c. Other than memorizing these values after digitalizing the watch shape computer 100 equips the health control software (software) 630 that evaluates the health status of the carrier of the watch shape computer. The health control software 630 of the watch shape computer has the lower and higher boundaries for the body temperature, the ambient temperature, the blood pulse rate and the activity status that are sampled, These boundary values are compared with the sampled values if these values exceed either higher or lower boundary. If the sampled value obtained by exceeds either boundary, which means the sampled value goes higher than the lower boundary or goes lower than the lower boundary, the display unit 140 displays the caution statement based on the content of the index to the carrier. And the caution is submitted from the audio unit 120. Either the display unit 140 or the audio unit 120 is in use depending upon the content of the notice or the both can be used at the same time or one which is more adequate can be used. For example the display show the message "Please stop the hard exercise" when the measured activity exceeds the upper boundary of the index. The audio function announces "Caution High body temperature. Please make a contact with your doctor" if the measures body temperature exceeds the upper boundary for more than a half day period of time. The carrier of the watch shape computer 100 who got the warning from the watch shape computer 100 will become possible to take an adequate action by himself. The information acquired by execution the health control software is transmitted on the air from the antenna 180 in the form of radio frequency through the transceiver 170. The antenna 270 of radio equipment 200 of the immobile station as the base station receives the information. The information received will be analyzed by the radio equipment 200 of the immobile station or by the communication computer 400 directly or indirectly connected the public communication network. And then necessary instruction is given to the carrier of the radio equipment 100 of the mobile station based on the result of the analysis. The content of the analysis done by the communication computer 400 will be sent toward the radio equipment 200 of the immobile station and then toward the watch shaped computer 100 from the radio equipment 200 of the immobile station. The radio equipment 100 of the mobile station receives the content and the watch shaped computer displays the message sent to the radio equipment 100 of the immobile station on the display unit 140 also with the message in audio form. For example the message such as "Hello How are you ?'" or the request such as "Please call following phone number."

The characteristic of this embodiment is the immediate notice or caution to the carrier of the radio equipment 100 of the mobile station based on the diagnostics the health control software is allowed to do. And the watch shape computer has a capability to inform the messages and instructions coming from outside of the watch shaped computer by display or audio.

Figure 8:
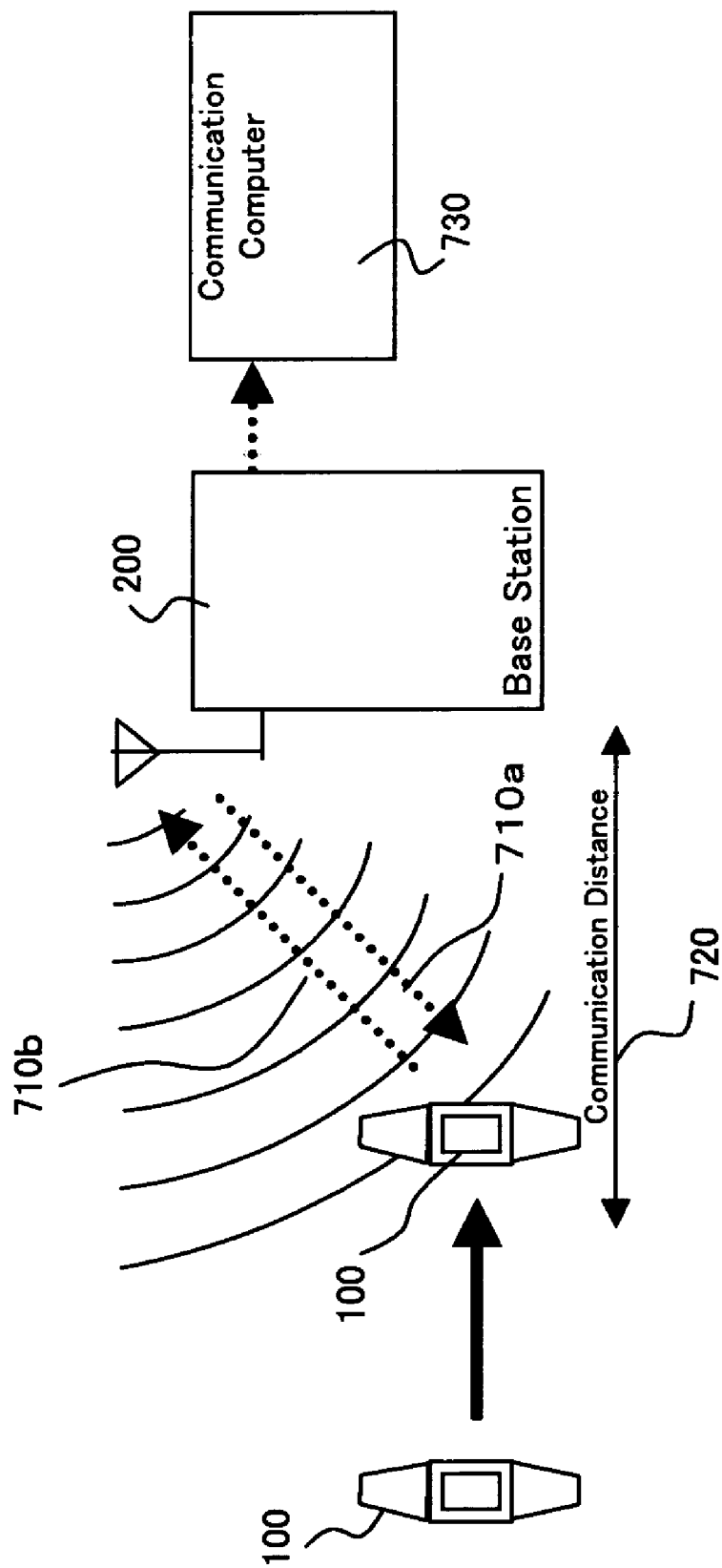
FIG. 8 is a pattern diagrams of the inter-reaction between the radio equipment of the mobile station and the radio equipment of the immobile station.

FIG. 8 indicates the inter-reaction between the radio equipment of the mobile station and the radio station of the immobile station.

The radio equipment 200 of the base station 170a sends, toward the radio equipment 100 of the mobile station continuously at short intervals of time, a signal acknowledging the radio equipment 100 of the mobile station and a command to send its data. The radio equipment 100 coming into the range of the radio equipment 200 of the immobile station sends 710b the data in the predefined format toward the radio equipment 200 of the mobile station when the radio equipment 100 of the mobile station comes into communication range with the radio equipment 200 of the immobile station. The radio equipment 100 of the immobile station transfers the received data to the remote communication computer 400 through the wired or radio means. The radio equipment 100 of the mobile station after confirming the data reception by the radio equipment 200 of the immobile station will reset only the data transferred and the new acquisition of data takes place. For the case of this embodiment the radio equipment 100 wakes up from the sleep mode after reception of radio frequency of the radio equipment 200 of the immobile station and the radio equipment 100 of the mobile station goes back into the sleep mode after all the assigned work has been done. The radio equipment 100 of the mobile station does not perform radio transmission actively so that it is possible to conserve the power of the battery in the radio equipment 100 of the mobile station.

Figure 9:
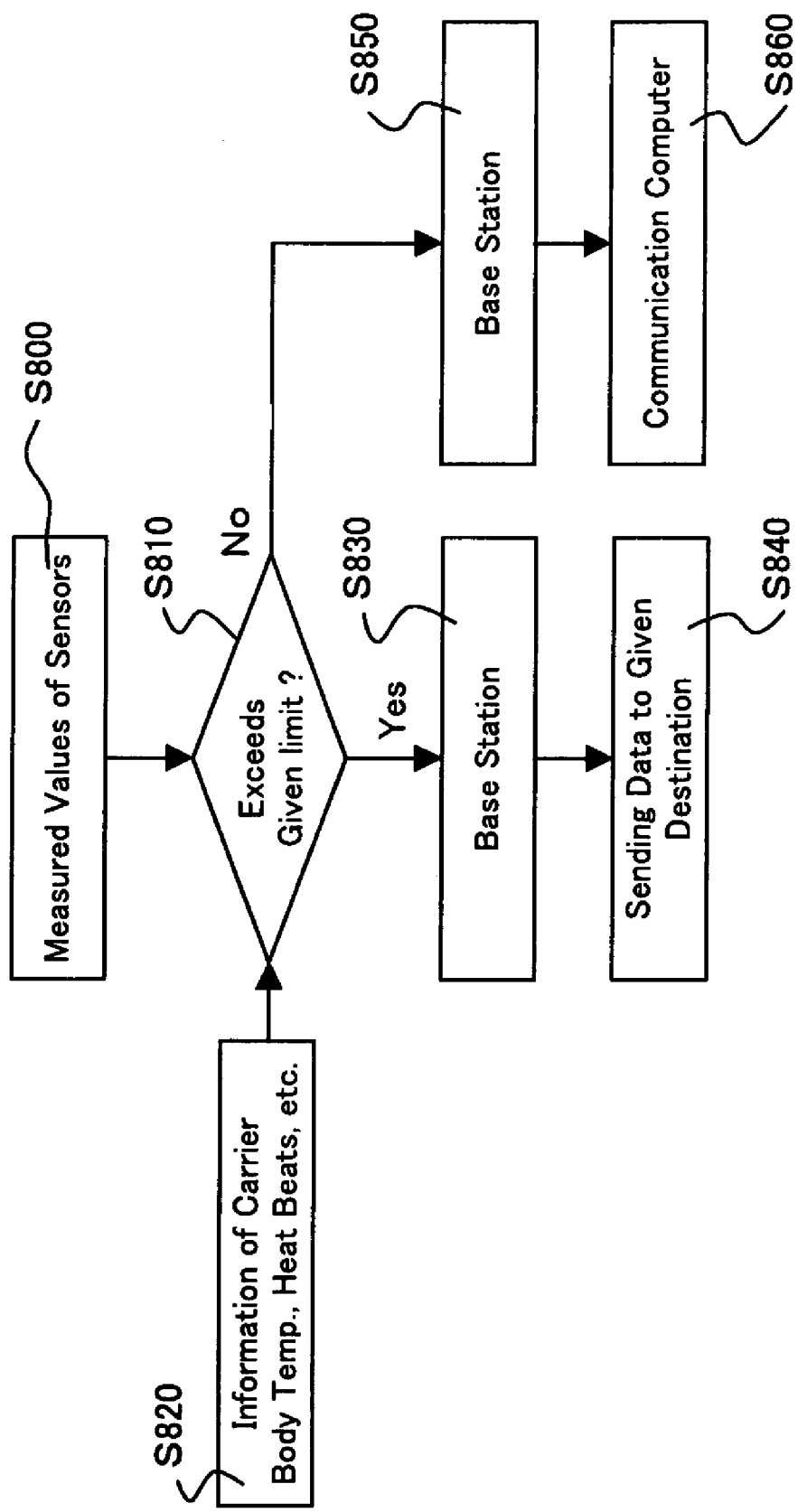
FIG. 9 is a flow chart showing the execution of life information of the carrier of the radio equipment of the mobile station.

FIG. 9 shows the flow chart to analyze the information of life activity of the carrier of the radio equipment 100 of the mobile station. The information of life activity is collected by using the sensor units equipped on the radio equipment 100 of the mobile station. (S800) The sampling by sensors should be done in sequence of time. The watch shaped computer keeps pre-acquired personal data of the carrier such as the range of his body temperature and blood pulse rate, or the index boundary of other root disease. The watch shaped computer in the radio equipment 100 of the mobile station determines whether the values of the carrier sampled by the sensor units 150 exceeds either upper or lower boundary. (S810) For the case not exceeding the boundary value the radio equipment 100 of the mobile station simply informs the result of determination toward the radio equipment 200 of the immobile station. (S850) The communication computer 400 analyzes the same content. (S860) In the other hand for the case exceeding the boundary value firstly the result of the determination will be set to the radio equipment 200 of the immobile station and then all the data will be sent or/and a call will be made to the pre-registered destinations (address). The address can be that of his doctor, member of his family, his relatives, his home helps, etc. A common or public mean of data transfer is adequate for this case of data transfer. In this embodiment the data has been sent to the destination by using email or facsimile capability of a personal computer. For the case the destination is his doctor his doctor can take an immediate action by looking at the sampled values and their boundary values. When the doctor send a message to his patient as the carrier of the radio equipment 100 of the mobile station, his message can goes by the opposite pass from where the data came. His message can be displayed on the display unit of the radio equipment 100 of the mobile station. This method of the data transfer is effective when the advance of disease is slow or when some kind of indication is shown before the actual indication of the disease shows up.

Figure 10:
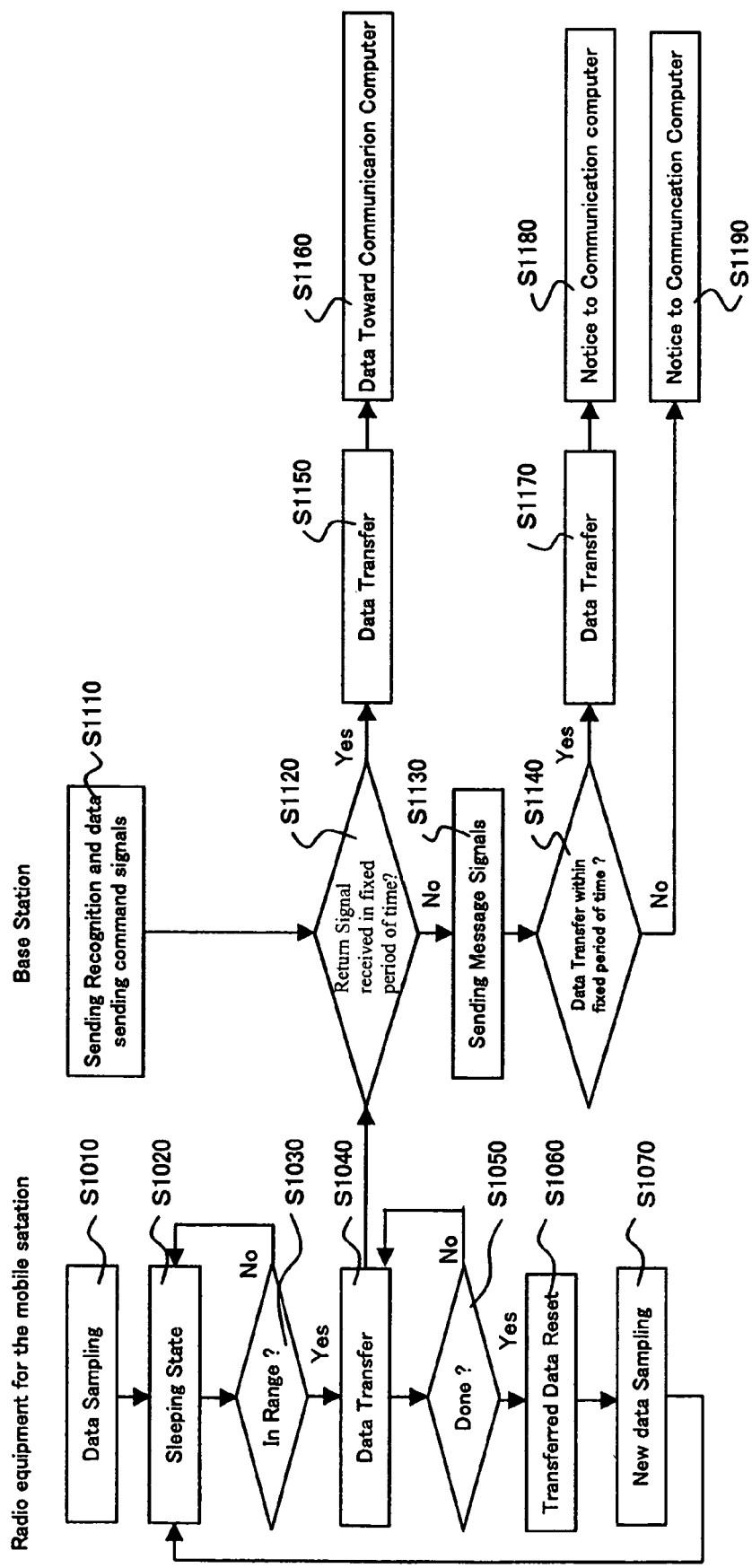
FIG. 10 is a flow chart showing the inter-reaction between the radio equipment of the mobile station and the radio equipment of the immobile station.

FIG. 10 shows the flow chart of the inter-reaction between the radio equipment 100 of the mobile station and the radio equipment 200 of the immobile station. The radio equipment 100 of the mobile station acquires the life information of the carrier by using the sensor units 150. (S1010) The radio equipment 100 of the mobile station finishes acquiring data goes into the sleeping state. (S1020) If the radio equipment 100 of the mobile station is within the communication range with the radio equipment 200 of the immobile station, the radio equipment 100 of the mobile station transfers the data to the radio equipment 200 of the immobile station. (S1040) The data to be transferred are the body temperature, the ambient temperature, blood pulse rate, etc. The data transfer will be continued (S1050) until data transfer is completed. (S1040) When data transfer is completed (S1050), then the data already transferred will be cleared. (S1060) Clearing the already transferred data makes more memory space for the upcoming data so that for even a small size memory the data can be collected and stored efficiently. After clearing already transferred data new data sampling takes place. (S1070) After sampling the radio equipment 100 of the mobile station goes back to the sleeping state (S1010) for conservation of power.

Once the radio equipment 200 of the immobile station recognizes the existence of the radio equipment 100 of the mobile station within the communication range, the radio equipment 200 of the immobile station sends a command to request data to the radio equipment 100 of the mobile station. (S1100) Then, the radio equipment 200 of the immobile station checks for the existence of an indication of data transfer from the radio equipment 100 of the mobile station. (S1120) If the data is received from the radio equipment 100 of the mobile station, the data received will be sent to the communication computer 400. (S1150) The data will be analyzed by the communication computer 400, and then the communication computer 400 prepares the instructions and/or the warning upon the necessity. (S1160)

On the other hand, if there is no indication of data transfer from the radio equipment 100 of the mobile station, the radio equipment 200 of the immobile station sends a message signal. (S1130) The radio equipment 200 of the immobile station determines whether there is any indication of data communication from the radio equipment 100 of the mobile station within a predefined period of time after sending the message signal. (S1140) If data communication is established within the predefined period of time, the radio equipment 200 of the immobile station sends forward the received data to the communication computer 400. (S1170) The communication computer 400 analyzes the forwarded data and the communication computer prepares the instructions and/or warnings upon necessity. (S1160) When no data communication is established within the predefined period of time, the fact of no communication is sent to the communication computer 400. (S1190) The communication computer commands to send a message of a pre-defined format to a pre-registered destination. Basically the radio equipment 200 of the immobile station that has a function of the base station is installed at a location where the carrier of the radio equipment 100 of the mobile station frequently passes by, such as the bathroom, the kitchen, the living room, etc.

The fact that the carrier of the radio equipment 100 of the mobile station does not pass by such place means the activity of the carrier is different from his or her usual activity. In such case, it can be assumed that the carrier has become physically disabled because of broken bones or has wandered off, such as in the case of a person who looks normal but is suffering from dementia. For the latter case, the distance the person has moved is related to the difference in time from the moment the person disappeared. If the moment the person disappeared is determined, it helps to determine the area in distance for which to look for him. The importance of this embodiment is to summarize the information related to the human activity and the environment in which the individual is located just for a person wearing the radio equipment 100 of the mobile station passing through the specific location where the radio equipment 200 of the immobile station is located.

Embodiment 3

Figure 11:
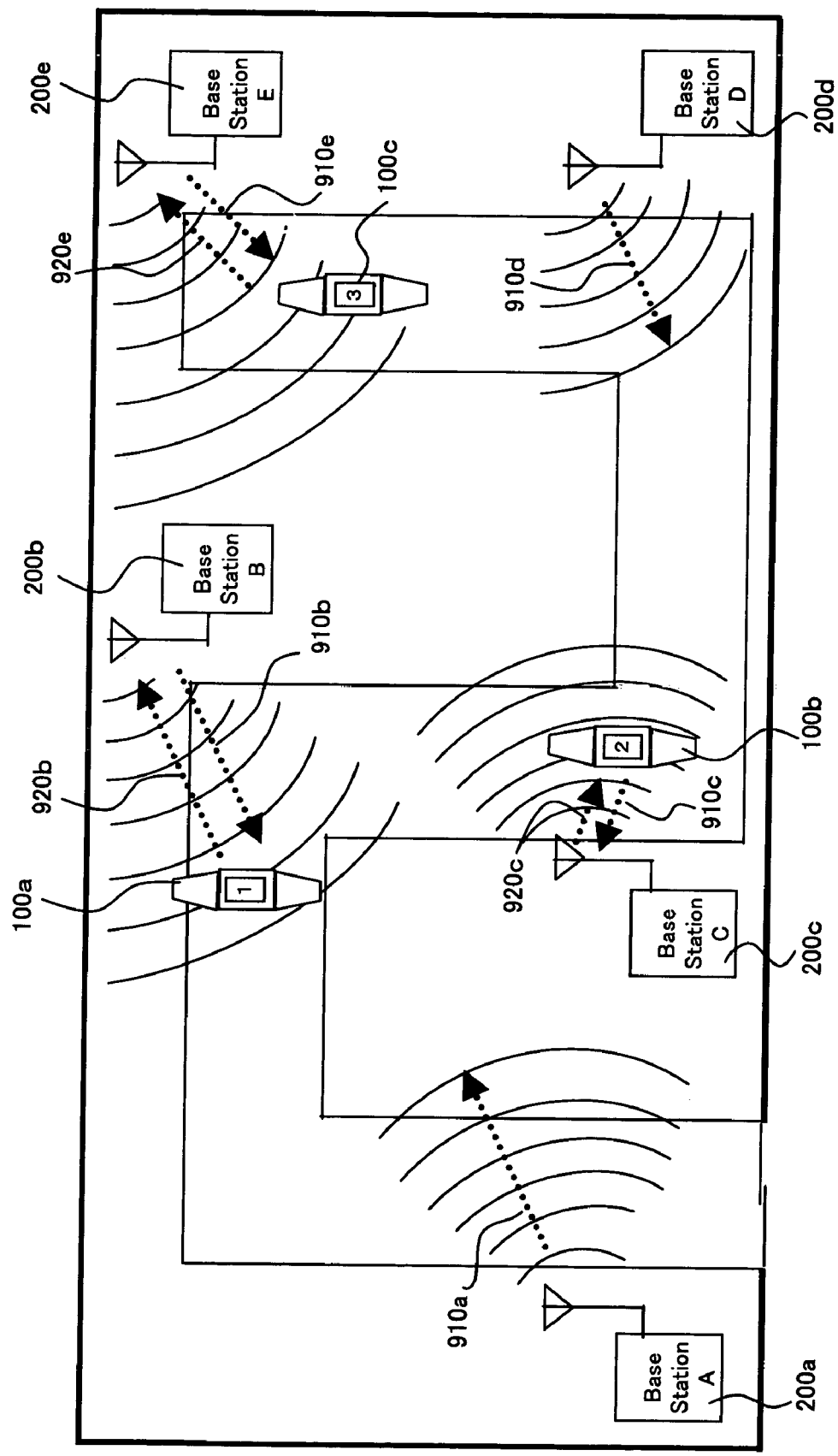
FIG. 11 is a figure of radio communication between the radio equipment of the mobile station and the radio equipment while multiple existences of the immobile radio station.

FIG. 11 indicates the radio communication between the radio equipment 100 of the mobile station and the radio equipment 200 of the immobile station where multiple immobile stations are installed. At the former embodiment the explanation has been made for the case of one radio equipment 100 of the mobile station and one corresponding radio equipment 200 of the immobile station that has a function of health monitoring system for an elderly person who lives alone or a patient who has underlying diseases. Under the existence of multiple radio equipments 100 of the mobile station and multiple radio equipments 200 following application is possible. FIG. 11 shows the pictorial example of this embodiment, This embodiment is executed under the condition that the radio equipment 100 of the mobile station has an identification number and a patient wearing the radio equipment 100 of the mobile station within a facility such as a hospital. The base stations, the five immobile stations numbered from A200a through A200e, are installed on such a place like a wall of a corridor. For the case of the radio equipment 200 of the immobile station 200a the radio equipment 200a of the immobile station sends the recognition signal 900a to the radio equipment 100 of the mobile station. When the radio equipment 100 of the mobile station wore by the patient is out of communication range with the radio equipment 200a, the radio equipment 200a is not possible to receive the data. For the case of radio equipment 200b of the immobile station the radio equipment 200b of the immobile station sends the recognition signal 910a. The radio equipment 100 of the mobile station that has the identification number 1 is within the communication range with the radio equipment 200*b* of the immobile station so that the radio equipment 100 of the mobile station transfers (910*b*) the data acquired in the radio equipment 100 of the mobile station to the radio equipment 200*b* of the immobile station. The data transferred to the radio equipment 200*b* of the immobile station will be sent forward the communication computer not shown on FIG. 11. For the case of the radio equipments 200*c* and 200*e* the recognition signals 910*c* by 200*c* and 910*e* by 200*e* will be sent. The radio equipment 100*b* of the mobile station that has its identification number 2 performs data transfer 920*c* to the radio equipment 200*c* and the radio equipment 100*c* of the mobile station that has its identification number 3 performs data transfer 920*e* to the radio equipment 200*e* of the immobile station as well. The each data transferred from either the radio equipments 200*c* or 200*e* of the immobile station will be sent the communication computer 400 not shown on FIG. 11. For the case of the radio equipment 200*d* of the immobile station the radio equipment 200*d* sends the signal (910*d*) to recognize the radio equipment 100 of the mobile station.

As described above, the life or biological data and the environmental data of the specific patient can be acquired by one of multiple installations of the radio equipment 200 of the immobile station. In addition the installation location of the radio equipment 200 of the immobile station tells the current location of the patients in the hospital.

Therefore, a message or an instruction can be sent to the specific patient. For example a message or an instruction is sent ot the patient who wears the radio equipment 100*a* a by passing the radio equipment 200*e* of the immobile station. The content of the message or instruction is displayed on the display unit of the radio equipment worn by the specific patient so that the message or the instruction can be sent only to the patient of the desired destination. If the content of the message or the instruction is related to the privacy of the specific patient, the advantage of this system is large.

What is claimed is:

1. A data transfer system comprising:
   a mobile station wearable by a living being and having at least one sensing device for detecting information of the living being corresponding to at least one of physiological information of a living being and information on an environment in which the living being is present, a memory unit for storing the information detected by the sensing device, and a transmitting device for transmitting signals containing the information stored in the memory unit in response to a start command; and
   a base station for transmitting the start command to instruct the mobile station to transmit the signals containing the information stored in the memory unit and thereafter receiving the transmitted signals from the mobile station only when the mobile station is within a preselected communication range from the base station.

2. A data transfer system according to claim 1; wherein the base station transmits command signals to the mobile station and the mobile station receives the command signals and executes commands based upon the content of the command signals.

3. A data transfer system according to claim 2; wherein the commands include displaying instructions on a display of the mobile station for viewing by the living being.

4. A data transfer system according to claim 2; wherein the commands include generating audible alarms by a sound generating device of the mobile station.

5. A data transfer system according to claim 1; wherein the information detected by the sensing device is physiological information comprising at least one of a blood pulse rate, a blood pressure, body movement, and body temperature.

6. A data transfer system according to claim 1; wherein the signals transmitted by the mobile station and the base station have circular polarization.

7. A data transfer system according to claim 1; further comprising a remote computer connectable to the base station over a communications medium for determining a status of the living being by receiving the information of the living being from the base station and analyzing the information.

8. A data transfer system according to claim 7; wherein the remote computer transfers a command to the mobile station when the living being passes by the base station.

9. A data transfer system according to claim 7; wherein the remote computer sends instructions to a predetermined location informing of an absence of communication with the mobile station if the base station determines that no signals containing the information of the living being have been received from the mobile station for a predetermined period of time after the base station has transmitted the start command.

10. A data transfer system according to claim 7; wherein the remote computer sends instructions to a predetermined location if one or more sampled values of the information of the living being that are received from the mobile station are outside a predefined range.

11. A data transfer system according to claim 1; wherein the base station sends instructions to a predetermined location informing of an absence of communication with the mobile station if the base station determines that no signals containing the information of the living being have been received from the mobile station for a predetermined period of time after the base station has transmitted the start command.

12. A data transfer system according to claim 1; wherein the base station sends instructions to a predetermined location if one or more sampled values of the information of the living being that are received from the mobile station are outside a predefined range.

13. A data transfer system according to claim 1; wherein the mobile station has a wrist strap for being worn on a wrist of the living being.

14. A data transfer system according to claim 1; wherein the base station is positioned at a location that the living being passes nearby on a regular basis.

15. A monitoring system for monitoring a plurality of living beings, comprising:
   a plurality of wearable monitoring devices each containing one or more sensors for monitoring information of a living being corresponding to at least one of physiological information of the living being and information on an environment in which the living being is present, a memory unit for storing the information detected by the sensor, and a transceiver for transmitting signals containing the information stored in the memory unit in response to a received start command;
   a base station for transmitting a unique start command to each of the wearable monitoring devices to instruct the monitoring devices to transmit the signals containing the information of the living being stored in the memory unit and thereafter receiving the signals only when each of the wearable monitoring devices is within a preselected communication range from the base station; and
   a remote computer connectable over a communications medium to the base station for determining a status of the living beings by receiving the information of the living being from the base station and analyzing the information.

16. A monitoring system according to claim 15; wherein the base station transmits individual command signals to each of the monitoring devices and the monitoring devices receive the command signals and execute commands based upon the content of the command signals.

17. A monitoring system according to claim 15; wherein the information detected by the sensor is physiological information comprising at least one of a blood pulse rate, a blood pressure, body movement, and body temperature.

18. A monitoring system according to claim 15; wherein signals transmitted by the monitoring devices and the base station have circular polarization.

19. A monitoring system according to claim 15; wherein the base station transmits a command to a respective monitoring device when the living being passes by the base station.

20. A monitoring system according to claim 15; wherein the remote computer sends instructions to a predetermined location informing of an absence of communication between the base station and a respective monitoring device if the base station has determined that no signals containing the information of the living being have been received from the respective monitoring device for a predetermined period of time after the base station has transmitted the start command.

21. A monitoring system according to claim 15; wherein the remote computer sends instructions to a predetermined location if one or more sampled values of the information of the living being that are received from a respective monitoring device are outside a predefined range.

22. A monitoring system according to claim 15; wherein the monitoring devices each have a wrist strap for being worn on a wrist of the living being.

23. A monitoring system according to claim 15; wherein the base station is positioned at a location that the living being passes nearby on a regular basis.

24. A data transfer system according to claim 1; wherein during transmission of the start command by the base station, the transmitting device of the mobile station does not transmit the information stored in the memory unit to the base station until the mobile station and the base station are within the preselected communication range from each other.

25. A data transfer system according to claim 24; wherein the base station includes means for transmitting the start command to the mobile station continuously at a preselected interval.

26. A data transfer system according to claim 1; wherein the transmitting device of the mobile station transmits the information stored in the memory unit to the base station only when the base unit transmits the start command and the mobile station and the base station are within the preselected communication range from each other.

27. A monitoring system according to claim 15; wherein during transmission of the unique start command to each of the wearable monitoring devices by the base station, the transceiver of each of the wearable monitoring devices does not transmit the information stored in the memory unit to the base station until the wearable monitoring device and the base station are within the preselected communication range from each other.

28. A monitoring system according to claim 27; wherein the base station includes means for transmitting the unique start command to each of the wearable monitoring devices continuously at a preselected interval.

29. A monitoring system according to claim 15; wherein the transceiver of each wearable monitoring device transmits the information stored in the memory unit to the base station only when the base unit transmits the corresponding unique start command and the wearable monitoring device and the base station are within the preselected communication range from each other.

* * * * *